United States Patent
Iwai

(10) Patent No.: US 10,121,160 B2
(45) Date of Patent: Nov. 6, 2018

(54) PERSON MOVEMENT ANALYSIS DEVICE, PERSON MOVEMENT ANALYSIS SYSTEM, AND PERSON MOVEMENT ANALYSIS METHOD

(71) Applicant: PANASONIC INTELLECTUAL PROPERTY MANAGEMENT CO., LTD., Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 378 days.

(21) Appl. No.: 15/037,150

(22) PCT Filed: Oct. 29, 2014

(86) PCT No.: PCT/JP2014/005462
§ 371 (c)(1),
(2) Date: May 17, 2016

(87) PCT Pub. No.: WO2015/075870
PCT Pub. Date: May 28, 2015

(65) Prior Publication Data
US 2016/0275534 A1    Sep. 22, 2016

(30) Foreign Application Priority Data
Nov. 20, 2013   (JP) .................................. 2013-239863

(51) Int. Cl.
*G06K 9/00*     (2006.01)
*G06Q 30/02*    (2012.01)
(Continued)

(52) U.S. Cl.
CPC ...... *G06Q 30/0205* (2013.01); *G06K 9/00335* (2013.01); *G06Q 10/0833* (2013.01); *G06Q 30/06* (2013.01); *H04N 7/188* (2013.01)

(58) Field of Classification Search
CPC ............... G06Q 30/02; G06Q 30/0201; G06Q 30/0202; G06Q 30/0242; G06Q 30/0246;
(Continued)

(56) References Cited

U.S. PATENT DOCUMENTS 6,654,047 B2 * 11/2003 Iizaka .................... G06Q 30/02
                                                  348/143
7,779,147 B1 *  8/2010 Wang .................... G06Q 30/02
                                                  709/235

(Continued)

FOREIGN PATENT DOCUMENTS

EP      2112637 A1   10/2009
EP      2618288 A1    7/2013
(Continued)

OTHER PUBLICATIONS

Search Report issued in European Patent Office (EPO) Patent Application No. 14863838.0, dated Oct. 12, 2016.
(Continued)

*Primary Examiner* — Carol Wang
(74) *Attorney, Agent, or Firm* — Greenblum & Bernstein, P.L.C.

(57) ABSTRACT

To enable a user such as a store manager to easily grasp movement of persons at a location within a monitored area, a PC for analyzing the movement of persons within the monitored area is provided with a measurement condition setter that causes a user to perform an input operation of specifying a measurement area in a region in the monitored area and specifying an entry zone and an exit zone of a person relative to the measurement area, and sets the mea-
(Continued)

surement area and the entry and exit zones as a measurement condition; a traffic line acquirer that acquires traffic line information of each person detected; a moving person detector that detects, in the measurement area, persons matching movement patterns defined by the entry and exit zones; and a screen generator that generates output information representing a state of movement of persons in relation to the measurement area.

12 Claims, 9 Drawing Sheets

(51) Int. Cl.
    *G06Q 30/06*     (2012.01)
    *G06Q 10/08*     (2012.01)
    *H04N 7/18*     (2006.01)

(58) Field of Classification Search
CPC ........ G06Q 30/06; G06Q 20/18; G06Q 10/06; G06Q 10/08; G06Q 10/06398; G06Q 10/103; G06Q 10/063; G06Q 10/0833; G06Q 10/0633; G06Q 10/0637; G06Q 10/0639; G06K 30/0205; G06K 9/00771; G06K 9/00778; G06K 9/00335; H04N 7/188
See application file for complete search history.

(56) References Cited

U.S. PATENT DOCUMENTS

| | | | | |
|---|---|---|---|---|
| 8,010,285 B1* | 8/2011 | Denise | ................... | G01C 21/36 340/995.21 |
| 8,098,888 B1* | 1/2012 | Mummareddy | ... | G06K 9/00778 382/103 |
| 8,812,344 B1* | 8/2014 | Saurabh | ............. | G06K 9/00778 705/7.29 |
| 8,885,047 B2* | 11/2014 | Golan | ................ | G06K 9/00771 348/150 |
| 8,918,327 B2 | 12/2014 | Hirakawa et al. | | |
| 9,191,633 B2 | 11/2015 | Fujimatsu et al. | | |
| 9,251,599 B2 | 2/2016 | Hirasawa et al. | | |
| 9,357,181 B2 | 5/2016 | Fujimatsu et al. | | |
| 2003/0002712 A1 | 1/2003 | Steenburgh et al. | | |
| 2006/0010028 A1 | 1/2006 | Sorensen | | |
| 2008/0294487 A1* | 11/2008 | Nasser | ................... | G06Q 30/02 705/7.32 |
| 2009/0003653 A1* | 1/2009 | Takahata | ................ | G06T 7/292 382/103 |
| 2009/0034797 A1* | 2/2009 | Senior | ................ | G06K 9/00771 382/104 |
| 2009/0164284 A1* | 6/2009 | Koiso | ................ | G06K 9/00335 705/7.29 |
| 2009/0319340 A1 | 12/2009 | Sekine et al. | | |
| 2011/0125551 A1* | 5/2011 | Peiser | ................... | G06Q 30/02 705/7.31 |
| 2014/0358639 A1 | 12/2014 | Takemoto et al. | | |
| 2015/0187088 A1 | 7/2015 | Iwai et al. | | |
| 2015/0222861 A1 | 8/2015 | Fujii et al. | | |
| 2016/0063731 A1 | 3/2016 | Yamamoto et al. | | |

FOREIGN PATENT DOCUMENTS

| | | | |
|---|---|---|---|
| JP | 2005-148863 A | 6/2005 | |
| JP | 2010-002997 A | 1/2010 | |
| JP | 2011-248836 A | 12/2011 | |
| JP | 2012-073915 A | 4/2012 | |
| JP | 5314200 B1 | 10/2013 | |

OTHER PUBLICATIONS

U.S. Appl. No. 15/027,540 to Hirofumi Fujii et al., filed Apr. 6, 2016.
Search Report issued by Japan patent office in Japan Patent Application No. PCT/JP2014/005462, dated Dec. 2, 2014.

* cited by examiner

PERSON MOVEMENT ANALYSIS DEVICE, PERSON MOVEMENT ANALYSIS SYSTEM, AND PERSON MOVEMENT ANALYSIS METHOD

TECHNICAL FIELD

The present invention relates to a person movement analysis device, a person movement analysis system and a person movement analysis method for analyzing a state of movement of persons in a monitored area based on captured images of the monitored area.

BACKGROUND ART

A monitoring system is widely adopted in stores such as convenience stores, in which cameras are set up in each store to capture images of an interior of the store so that persons in the store can be monitored by the images captured by the cameras. If an arrangement is made to enable grasping the state of movement of persons in the store by use of the images captured by the cameras, it becomes possible to attempt to increase the sales and profit of the store by contemplating an improvement of the way of displaying items in the store, etc.

As a technology relating to such analysis of the state of movement of customers in the store, a technology is conventionally known which sets a detection line on the images obtained by a camera that captures images of a monitored area, and counts the persons moving across the detection line (see Patent Document 1). In this technology, to address a problem that an erroneous counting may occur when the images are obtained by image-capturing the monitored area at an oblique angle with a camera having a predetermined angle of view, such as a box camera, the counting is performed taking into account the direction of movement of the persons, to thereby improve the measurement accuracy.

PRIOR ART DOCUMENT(S)

Patent Document(s)

Patent Document 1: JP2005-148863A

BRIEF SUMMARY OF THE INVENTION

Task to be Accomplished by the Invention

However, in the above prior art technology, though the number of persons passing the detection line may be measured with high accuracy, there is a problem that, with only the number of persons moving across the detection line, it is not possible for a user such as a store manager to easily grasp the state of movement of customers in the store, particularly the state of movement of customers at important locations such as an intersection of passages.

The present invention has been made to solve such prior art problems, and a main object thereof is to provide a person movement analysis device, a person movement analysis system and a person movement analysis method configured to enable a user such as a store manager to easily grasp the state of movement of persons at an important location within the monitored area.

Means to Accomplish the Task

A person movement analysis device of the present invention is a person movement analysis device for analyzing state of movement of persons in a monitored area based on captured images of the monitored area, the device comprising: a measurement condition setting unit that causes a user to perform an input operation of specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition; a traffic line acquisition unit that acquires traffic line information of each person detected from the images; a moving person detection unit that detects, in the measurement area, persons matching a movement pattern(s) defined by at least one of the entry zone and the exit zone, based on the traffic line information acquired by the traffic line acquisition unit; and an output information generation unit that generates, based on a result of detection by the moving person detection unit, output information representing a state of movement of persons for each movement pattern in the measurement area.

Further, a person movement analysis system of the present invention is a person movement analysis system for analyzing a state of movement of persons within a monitored area based on captured images of the monitored area, the system comprising: a camera for capturing images of the monitored area; and a plurality of information processing devices, wherein any one of the plurality of information processing devices comprises: a measurement condition setting unit that causes a user to perform an input operation of specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition; a traffic line acquisition unit that acquires traffic line information of each person detected from the images; a moving person detection unit that detects, in the measurement area, persons matching a movement pattern(s) defined by at least one of the entry zone and the exit zone, based on the traffic line information acquired by the traffic line acquisition unit; and an output information generation unit that generates, based on a result of detection by the moving person detection unit, output information representing a state of movement of persons for each movement pattern in the measurement area.

Further, a person movement analysis method of the present invention is a person movement analysis method for making an information processing device perform a process of analyzing a state of movement of persons within a monitored area based on captured images of the monitored area, the method comprising: a step of causing a user to perform an input operation of specifying a measurement area in a walkable region, which is a region in the monitored area other than a non-walkable region and specifying at least one of an entry zone and an exit zone of persons relative to the measurement area, and in response to the input operation of the user, setting the measurement area and at least one of the entry zone and the exit zone as a measurement condition; a step of acquiring traffic line information of each person detected from the images; a step of detecting, in the measurement area, persons matching a movement pattern(s) defined by at least one of the entry zone and the exit zone, based on the traffic line information acquired by the step of acquiring; and a step of generating, based on a result of detection by the step of detecting, output information representing a state of movement of persons for each movement pattern in the measurement area.

Effect of the Invention

According to the present invention, output information representing the state of movement of persons for each movement pattern defined by at least one of the entry zone and the exit zone relative to the measurement area is output, and therefore, by setting the measurement area at an important location, such as an intersection of passages, for example, within the monitored area of a store or the like, it is possible for a user such as a store manager to easily grasp the state of movement of persons at the important location within the monitored area.

EMBODIMENTS FOR CARRYING OUT THE INVENTION

Figure 1:
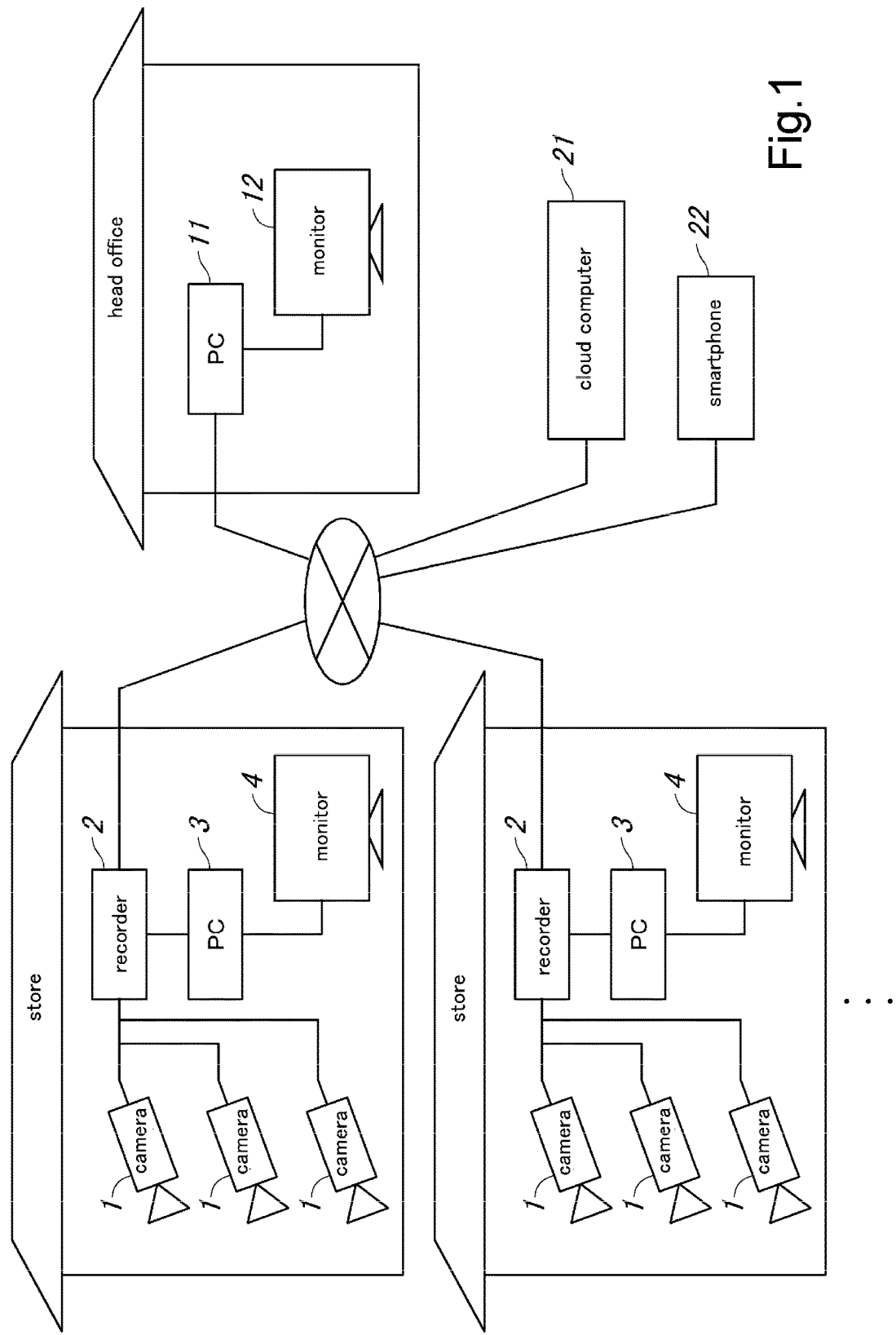
FIG. 1 is an overall configuration diagram of a person movement analysis system according to an embodiment of the present invention.

To achieve the above object, the first aspect of the present invention provides a person movement analysis device for analyzing state of movement of persons in a monitored area based on captured images of the monitored area, the device comprising: a measurement condition setting unit that causes a user to perform an input operation of specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition; a traffic line acquisition unit that acquires traffic line information of each person detected from the images; a moving person detection unit that detects, in the measurement area, persons matching a movement pattern(s) defined by at least one of the entry zone and the exit zone, based on the traffic line information acquired by the traffic line acquisition unit; and an output information generation unit that generates, based on a result of detection by the moving person detection unit, output information representing a state of movement of persons for each movement pattern in the measurement area.

According to this configuration, output information representing the state of movement of persons for each movement pattern defined by at least one of the entry zone and the exit zone relative to the measurement area is output, and therefore, by setting the measurement area at an important location, such as an intersection of passages, within the monitored area of a store or the like, it is possible for a user such as a store manager to easily grasp the state of movement of persons at the important location within the monitored area.

In the second aspect of the present invention, the person movement analysis device further comprises an aggregation unit that aggregates the result of detection by the moving person detection unit for each predetermined aggregation period and acquires the number of persons for each movement pattern for each aggregation period, wherein the output information generation unit generates output information relating to the number of persons for each movement pattern for each aggregation period acquired by the aggregation unit.

According to this configuration, the user can grasp the number of persons for each movement pattern for each aggregation period. Further, by displaying the number of persons for each movement pattern for each aggregation period so as to be arranged in chronological order, it is possible to enable the user to grasp the characteristics of temporal change in the number of persons for each movement pattern.

In the third aspect of the present invention, the measurement condition setting unit sets a plurality of said measurement areas within the monitored area in response to an input operation of the user; the moving person detection unit detects, in each of the measurement areas, persons matching the movement pattern(s); and the output information generation unit generates output information representing the state of movement of persons for each movement pattern in each of the measurement areas.

According to this configuration, a measurement area can be set at each of multiple important locations present in the monitored area, whereby the user can grasp the state of movement of persons at each of the important locations within the monitored area.

In the fourth aspect of the present invention, the measurement condition setting unit sets at least one of the entry zone and the exit zone relative to each of the plurality of measurement areas based on a plurality of reference directions predetermined for the entire monitored area.

According to this configuration, the entry and exit zones are set based on the reference directions common to the multiple measurement areas, and this makes it possible to easily compare the state of movement of persons in one measurement area with that in another measurement area. In addition, when specifying the entry and exit zones, the user is only required to select from among the multiple reference directions on the basis of the non-walkable region around each measurement area, and therefore, the operation for specifying the entry and exit zones becomes easy.

In the fifth aspect of the present invention, the measurement condition setting unit sets both the entry zone and the exit zone in response to an input operation of the user; and the moving person detection unit detects persons separately for each movement pattern defined by a combination of the entry zone and the exit zone.

According to this configuration, the user can grasp what routes (including before and after passing through the measurement area) persons took to pass through the measurement area, whereby the user can grasp the state of movement of persons passing through the measurement area in detail.

In the sixth aspect of the present invention, the output information generation unit generates, as the output information, display information for displaying the state of movement of persons for each movement pattern in an arrangement.

According to this configuration, the user can grasp at a glance the difference in the state of movement of persons between the movement patterns.

In the seventh aspect of the present invention, the moving person detection unit detects persons separately for each of the movement pattern(s) defined by at least one of the entry zone and the exit zone; and the output information generation unit generates, as the output information, display information for displaying the number of persons for each movement pattern in a radar chart.

According to this configuration, the user can grasp at a glance the number of persons for each movement pattern defined by the entry zone of the exit zone. Namely, the user can grasp at a glance how many persons have moved from the measurement area in which direction, or how many persons have entered the measurement area from which direction.

In the eighth aspect of the present invention, the images include those captured by an omnidirectional camera.

According to this configuration, since an omnidirectional camera can cover a wide range, the number of cameras to be installed can be reduced. In addition, by installing the omnidirectional camera on the ceiling, it becomes possible to set the position of the measurement area definitely on the image, and because the state of passing of the traffic line of each person through the measurement area becomes clear, the analysis accuracy can be improved.

In the ninth aspect of the present invention, the measurement area has a polygonal shape and is set such that all vertices thereof are in contact with the non-walkable region and at least two sides thereof cross the walkable region.

According to this configuration, it is possible to detect the persons passing through the walkable region without fail, whereby the user is enabled to grasp the state of movement of persons accurately. In addition, when specifying a measurement area, the user is only required to input the positions of the vertices of a polygon, and therefore, the operation for specifying the measurement area becomes easy.

In the tenth aspect of the present invention, the measurement area has a rectangular shape, and in a case where the walkable region forms a cross-shaped intersection, is set such that four vertices of the measurement area are positioned on corner points of the non-walkable region.

According to this configuration, it is possible to detect the persons passing through the cross-shaped intersection without fail, whereby the user can grasp the state of movement of persons at the cross-shaped intersection accurately.

In the eleventh aspect of the present invention, the measurement area has a rectangular shape, and in a case where the walkable region forms a T-shaped intersection, is set such that one side of the measurement area contacts the non-walkable region and two vertices of the measurement area are positioned on corner points of the non-walkable region.

According to this configuration, it is possible to detect the persons passing through the T-shaped intersection without fail, whereby the user can grasp the state of movement of persons at the T-shaped intersection accurately.

The twelfth aspect of the present invention provides a person movement analysis system for analyzing a state of movement of persons within a monitored area based on captured images of the monitored area, the system comprising: a camera for capturing images of the monitored area; and a plurality of information processing devices, wherein any one of the plurality of information processing devices comprises: a measurement condition setting unit that causes a user to perform an input operation of specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition; a traffic line acquisition unit that acquires traffic line information of each person detected from the images; a moving person detection unit that detects, in the measurement area, persons matching a movement pattern(s) defined by at least one of the entry zone and the exit zone, based on the traffic line information acquired by the traffic line acquisition unit; and an output information generation unit that generates, based on a result of detection by the moving person detection unit, output information representing a state of movement of persons for each movement pattern in the measurement area.

According to this configuration, as in the first aspect of the present invention, it is possible for a user such as a store manager to easily grasp the state of movement of persons at an important location within the monitored area.

The thirteenth aspect of the present invention provides a person movement analysis method for making an information processing device perform a process of analyzing a state of movement of persons within a monitored area based on captured images of the monitored area, the method comprising: a step of causing a user to perform an input operation of specifying a measurement area in a walkable region, which is a region in the monitored area other than a non-walkable region and specifying at least one of an entry zone and an exit zone of persons relative to the measurement area, and in response to the input operation of the user, setting the measurement area and at least one of the entry zone and the exit zone as a measurement condition; a step of acquiring traffic line information of each person detected from the images; a step of detecting, in the measurement area, persons matching a movement pattern(s) defined by at least one of the entry zone and the exit zone, based on the traffic line information acquired by the step of acquiring; and a step of generating, based on a result of detection by the step of detecting, output information representing a state of movement of persons for each movement pattern in the measurement area.

According to this configuration, as in the first aspect of the present invention, it is possible for a user such as a store manager to easily grasp the state of movement of persons at an important location within the monitored area.

Hereinafter, embodiments of the present invention will be described with reference to the drawings.

FIG. 1 is an overall configuration diagram of a person movement analysis system according to the present embodiment. This person movement analysis system is typically designed for a chain of retail stores such as convenience stores, and includes cameras (imaging device) 1, a recorder (image recording device) 2, a PC (person movement analysis device) 3 and a monitor (display device) 4, which are set up at each of multiple stores. The system further includes a PC 11 and a monitor 12, which are set up at a head office overseeing the multiple stores.

The cameras 1 are set up at appropriate locations in the store to capture images of an interior of the store, and image information obtained thereby is recorded by the recorder 2. On the PC 3 set up at the store and the PC 11 set up at the head office, it is possible to browse the images of the interior of the store captured by the cameras 1 in real time and browse the past images of the interior of the store recorded in the recorder 2, and this allows a user at the store or the head office to check the situation in the store.

The PC 3 set up at each store is configured as a person movement analysis device that performs analysis of the state of movement of persons in the store. The analysis result information generated by the PC 3 set up at the store can be displayed on the PC 3 itself and also is transmitted to the PC 11 set up at the head office, such that the information can be displayed on the PC 7. Thus, the PCs 3 and 11 are each configured as a browser device that allows a user to view the analysis result information.

Figure 2:
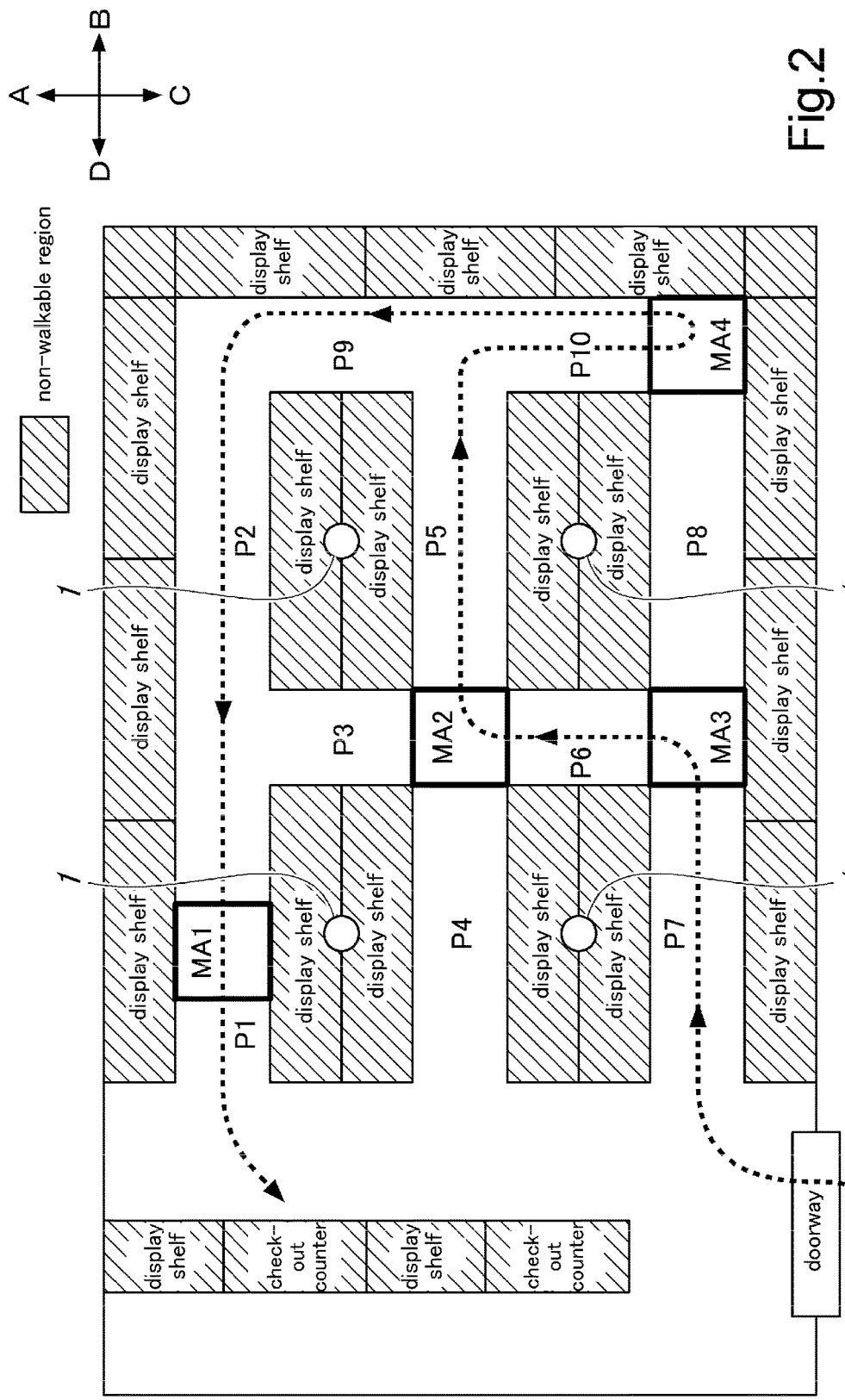
FIG. 2 is a plan view of a store for explaining a layout of the store, an arrangement of cameras 1, and a state of movement of persons (customers)

Next, taking a convenience store as an example, description will be made of a layout of the store, an arrangement of the cameras 1, and a state of movement of customers. FIG. 2 is a plan view of a store for explaining a layout of the store, an arrangement of the cameras 1, and a state of movement of persons (customers).

The store includes a doorway, display shelves, and checkout counters. A customer enters the store through the doorway, moves in the store through passages between the display shelves, and when a desired item is found, goes to the checkout counter with the item, and makes a payment at the checkout counter before exiting the store.

Multiple cameras 1 are installed in the store to capture images of a monitored area (interior of the store). Particularly, in the example shown in FIG. 2, an omnidirectional camera using a fish-eye lens to have a view range of 360 degrees is employed as each camera 1, and these cameras 1 are installed in the ceiling immediately above the center of corresponding display shelves, whereby they can capture images of persons moving in the store through the passages.

Figure 3:
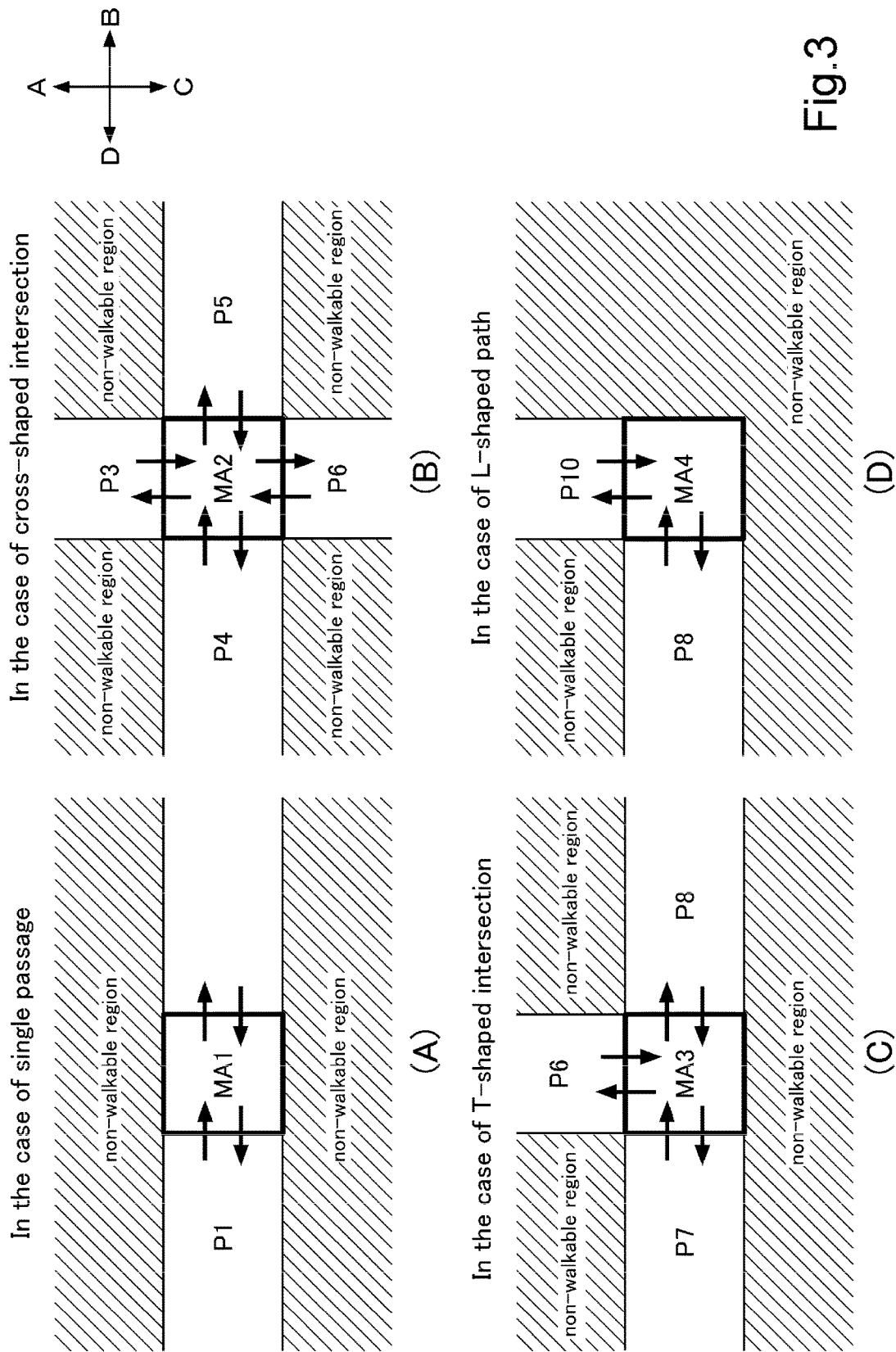
FIG. 3 is an explanatory diagram in (A)-(D) for explaining an overview of a person movement analysis process executed by a PC 3.
Figure 4:
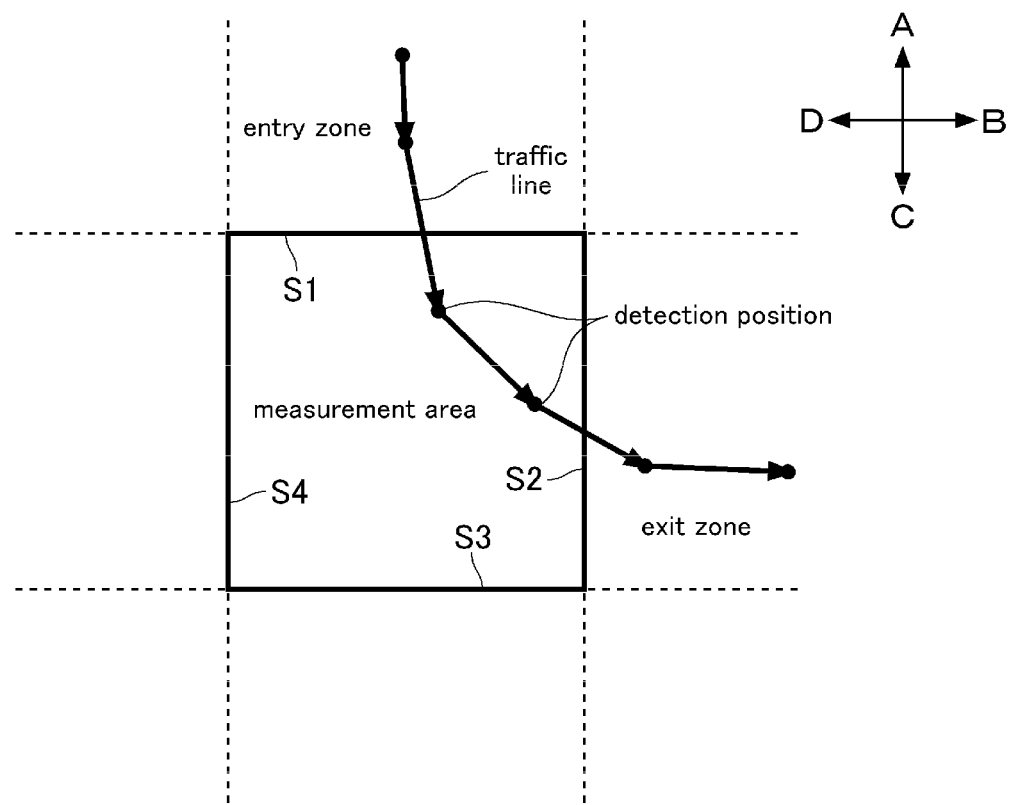
FIG. 4 is an explanatory diagram for explaining an overview of a moving person detection process executed in the person movement analysis process.

Next, description will be made of an overview of a person movement analysis process executed by the PC 3 shown in FIG. 1. FIG. 3 is an explanatory diagram for explaining an overview of a person movement analysis process executed by the PC 3. FIG. 4 is an explanatory diagram for explaining an overview of a moving person detection process executed in the person movement analysis process.

The PC 3 executes a person movement analysis process of analyzing a state of movement of persons within the monitored area based on the images obtained by the cameras 1 that capture images of the monitored area. Particularly, in the present embodiment, as shown in FIG. 2, regions in which the display shelves and the checkout counter are installed are regarded as non-walkable regions, and measurement areas are set in a walkable region which is a region in the monitored area other than the non-walkable regions, so that persons passing through each measurement area are detected for each movement pattern and the number of persons detected for each movement pattern is counted.

In the present embodiment, the passage in which a person was present immediately before the person enters a measurement area is referred to as an entry zone, and the passage in which the person is present immediately after the person exited the measurement area is referred to as an exit zone, and movement patterns are defined by specifying the entry and exit zones relative to the measurement area, so that persons matching each movement pattern are detected to count the number of persons for each movement pattern.

Particularly, in the present embodiment, four directions A, B, C and D serving as a reference for the entire monitored area are predetermined, and based on the reference directions A, B, C and D, the entry and exit zones are set for each of the multiple measurement areas. Namely, the positional relationship of the entry and exit zones relative to each measurement area is determined using the reference directions A, B, C and D. For example, in a case where a person moves through a measurement area as illustrated in FIG. 4, the entry and exit zones relative to the measurement area are indicated as the directions A and B, respectively.

It is to be noted that the four reference directions A, B, C and D are preferably set to be substantially parallel to the directions of passages provided in the interior of the store or the monitored area. Since the passages are typically provided in the store so as to cross each other orthogonally, the four reference directions A, B, C and D are set such that adjoining two of them define an angle of about 90 degrees therebetween.

When detecting persons matching a movement pattern, a determination is made based on a state of intersection between sides S1, S2, S3 and S4 of the measurement area that face the entry and exit zones of persons relative to the measurement area and a traffic line representing the path of movement of each person. For example, for a movement pattern defined by the entry and exit zones relative to the measurement area respectively specified as the directions A and B, a determination is made based on a state of intersection between the sides S1, S2 and the traffic line, so that if the traffic line crosses the side S1 when the person enters the measurement area and the traffic line crosses the side S2 when the person exits the measurement area, it is determined that the person matches the movement pattern. It is to be noted that the traffic line is generated by connecting the detection points of the person in chronological order.

Further, in the example shown in FIG. 2, a first measurement area MA1 is set in the middle of a single passage P1, a second measurement area MA2 is set at a cross-shaped intersection where four passages P3 to P6 meet, a third measurement area MA3 is set at a T-shaped intersection where three passages P6 to P8 meet, and a fourth measurement area MA4 is set at an L-shaped path where two passages P8, P10 are connected together at a normal angle.

By setting a measurement area at a position that is not an intersection, as are the first measurement area MA1 and the fourth measurement area MA4, it is possible to count the number of persons passing in front of a particular display shelf. Also, by setting a measurement area at an intersection, as are the second measurement area MA2 and the third measurement area MA3, it is possible to count the number of persons for each movement pattern that may be observed when the persons pass through the intersection. Thereby, the user is allowed to grasp how many persons have passed the intersection in what route.

In the present embodiment, each measurement area has a rectangular shape and is set such that the all vertices thereof are in contact with the non-walkable regions, and at least two sides thereof cross the walkable region. Each side of the measurement area is disposed to be perpendicular to one of the reference directions A, B, C and D.

The first measurement area MA1 shown in FIG. 2 has two mutually opposing sides in contact with non-walkable regions as shown in FIG. 3(A); namely, the two sides are positioned on the boundary lines of the non-walkable regions. Thereby, the persons passing through the passage P1 can be counted without fail. In this first measurement area MA1, the entry and exit zones each may be either the direction B or D. Thus, if the entry zone is set as the direction D and the exit zone is set as the direction B, for example, the persons moving through the passage P1 rightward will be counted.

The second measurement area MA2 shown in FIG. 2 is set such that the four vertices thereof are positioned on corner points of non-walkable regions, as shown in FIG. 3(B). Thereby, the persons passing through the cross-shaped intersection can be counted without fail. In this second measurement area MA2, the entry and exit zones each may be any of the directions A, B, C and D. Thus, if the entry zone is set as the direction A and the exit zone is set as the direction B, for example, the persons moving from the passage P3 to the passage P5 through the cross-shaped intersection will be counted.

The third measurement area MA3 shown in FIG. 2 is set such that one side thereof contacts a non-walkable region or is positioned on the boundary line of the non-walkable region, and two vertices thereof are positioned on corner points of other non-walkable regions, as shown in FIG. 3(C). Thereby, the persons passing through the T-shaped intersection can be counted without fail. In this third measurement area MA3, the entry and exit zones each may be either the direction A, B or D. Thus, if the entry zone is set as the direction A and the exit zone is set as the direction B, for example, the persons moving from the passage P6 to the passage P8 through the cross-shaped intersection will be counted.

The fourth measurement area MA4 shown in FIG. 2 is set such that mutually adjoining two sides contact a non-walkable region or are positioned on the boundary line of the non-walkable region, and one vertex is positioned on a corner point of another non-walkable region, as shown in FIG. 3(D). Thereby, the persons passing through the L-shaped path can be counted without fail. In this fourth measurement area MA4, the entry and exit zones each may be either the direction A or D. Thus, if the entry zone is set as the direction A and the exit zone is set as the direction D, for example, the persons moving from the passage P10 to the passage P8 through the L-shaped path will be counted.

It is to be noted that in a case where persons who enter the measurement area and then turn back are to be detected, the entry and exit zones may be set as the same direction, and this is not limited to the L-shaped path. In the case where the entry and exit zones are set as the same direction, it is possible to know that a point of interest of the walking persons was present in the past.

Figure 5:
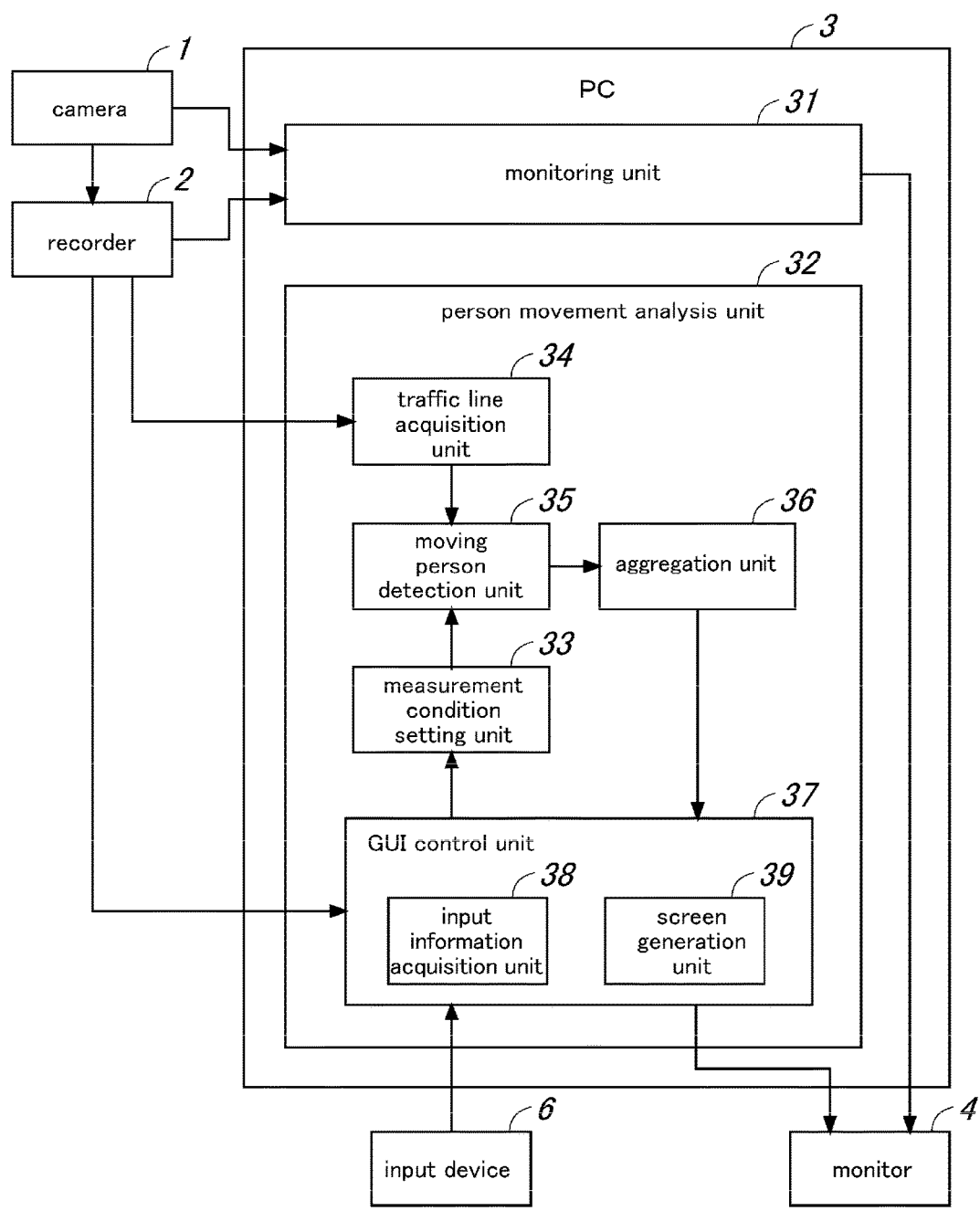
FIG. 5 is a functional block diagram schematically showing the configuration of the PC 3.

Next, the process executed by the PC 3 shown in FIG. 1 will be described with reference to a functional block diagram. FIG. 5 is a functional block diagram schematically showing the configuration of the PC 3.

The PC 3 includes a monitoring unit 31 and a person movement analysis unit 32. The monitoring unit 31 allows the PC 3 to function as a monitoring system for monitoring the interior of the store. The monitoring unit 31 controls the operation of the cameras 1 and the recorder 2 and enables the user to have a real-time view of the images of the interior of the store captured by the cameras 1 as well as to view the images of the interior of the store recorded in the recorder 2.

The person movement analysis unit 32 performs a person movement analysis process to analyze a state of movement of persons within the monitored area based on the captured images of the monitored area, and includes a measurement condition setting unit 33, a traffic line acquisition unit 34, a moving person detection unit 35, an aggregation unit 36 and a GUI control unit 37.

The measurement condition setting unit 33 executes a process of causing the user to perform an input operation by which the user specifies a measurement area in the walkable region, which is a region in the monitored area other than the non-walkable regions and specifies an entry zone and an exit zone of persons relative to the measurement area, and in response to the input operation of the user, the measurement condition setting unit 33 performs a process of setting the measurement area and the entry and exit zones as a measurement condition.

The traffic line acquisition unit 34 executes a process of acquiring traffic line information of each person detected in the images from the cameras 1. In this traffic line acquisition process, traffic lines are generated by connecting the positions of each person in chronological order, where the positions of the person at respective detection time points (imaging time points) are obtained by a person tracking process that detects the positions of persons in the frames of images.

It is to be noted that in the present embodiment, to enable the moving person detection unit 35 to determine the state of intersection between the sides (boundary lines) of each measurement area and the traffic lines, the traffic line acquisition unit 34 acquires the traffic line information at least in and around each measurement area. Further, in the determination of the state of intersection between the sides of each measurement area and the traffic lines, it is not necessary to obtain the intersection points between the sides of the measurement area and the traffic lines, and the determination may be made based on only the information of the detection positions located in chronological order. Therefore, the traffic line information acquired by the traffic line acquisition unit 34 does not have to necessarily include information of the line segments (vectors) that connect the detection points.

Further, the person tracking process may use known image recognition technology (person detection technology, person tracking technology, etc.). Though the person tracking process may be performed by the traffic line acquisition unit 34, it may also be performed by a person tracking device provided separately from the PC 3 or an imaging device with a tracking function, namely, a camera 1 having the person tracking function incorporated therein. Further, it is also possible that the traffic line generation process of generating traffic lines by connecting the detection points of each person in chronological order is performed by a person tracking device separate from the PC 3, such that the information relating to the traffic lines generated thereby is provided to the traffic line acquisition unit 34.

The moving person detection unit 35 executes a process of detecting, in each measurement area, persons matching the movement pattern(s) defined by the entry and exit zones, based on the traffic line information acquired by the traffic line acquisition unit 34. In this passing person detection process, the determination relating to the movement pattern is performed based on the state of intersection between the sides (boundary lines) of each measurement area and each traffic line as well as a direction of movement at points where the traffic line crosses the boundary lines of the measurement area.

Particularly, in the present embodiment, the moving person detection is performed with the movement patterns each defined by a combination of an entry zone and an exit zone. In this case, it is determined that a person matches a movement pattern if the traffic line crosses a side of a measurement area adjacent to the entry zone and the direction of movement there is from outside to inside of the measurement area, and if the traffic line crosses a side of the measurement area adjacent to the exit zone and the direction of movement there is from inside to outside of the measurement area.

Further, in the present embodiment, it is also possible to perform the moving person detection with the movement patterns each defined by one of an entry zone and an exit zone. In this case, for a movement pattern defined by an entry zone, it is determined that a person matches the movement pattern if the traffic line crosses a side of a measurement area adjacent to the entry zone and the direction of movement there is from outside to inside of the measurement area. On the other hand, for a movement pattern defined by an exit zone, it is determined that a person matches the movement pattern if the traffic line crosses a side of a measurement area adjacent to the exit zone and the direction of movement there is from inside to outside of the measurement area.

The aggregation unit 36 performs a process of aggregating the result of detection performed by the moving person detection unit 35 on the basis of a predetermined aggregation period (for example, one hour or one day) and thereby obtaining the number of persons for each movement pattern for each aggregation period. Particularly, in the present embodiment, multiple measurement areas are set and multiple movement patterns are set for each measurement area, and therefore, the aggregation unit 36 aggregates the number of persons for each of the movement patterns set for each measurement area on the basis of the aggregation period.

It is to be noted that the traffic line information acquired by the traffic line acquisition unit 34 contains the detection time points (imaging time points) obtained in the person tracking process, and from these detection time points, it is possible to acquire the time points of entry and exit of a person of interest into and from the measurement area, and based on these time points, it is possible to perform the aggregation on the basis of the aggregation period.

The GUI control unit 37 executes a process of acquiring input information entered by an input operation of the user through a GUI (Graphical User Interface) using a monitor 4 and an input device (input unit) 6 such as a mouse and a process of outputting the analysis result relating to the state of movement of persons, and includes an input information acquisition unit 38 and a screen generation unit (output information generation unit) 39.

The screen generation unit 39 executes a process of generating display information relating to a measurement condition input screen for allowing the user to input a measurement condition and an analysis result output screen for displaying the analysis result relating to the state of movement of persons, such that the measurement condition input screen and the analysis result output screen are displayed on the monitor 4. The input information acquisition unit 38 executes a process of acquiring input information in response to an input operation performed by the user using the input device 6 on the measurement condition input screen displayed on the monitor 4. Based on the input information acquired by the input information acquisition unit 38, the measurement condition setting unit 33 executes a process of setting the measurement condition.

It is to be noted that the monitoring unit 31 and the person movement analysis unit 32 are realized by executing programs for monitoring and person movement analysis by the CPU of the PC 3. These programs may be pre-installed in the PC 3 serving as an information processing device to embody a dedicated device, or may be provided to the user in the form stored in an appropriate program recording medium or through the network as an application program that can be run on a general purpose OS.

Figure 6:
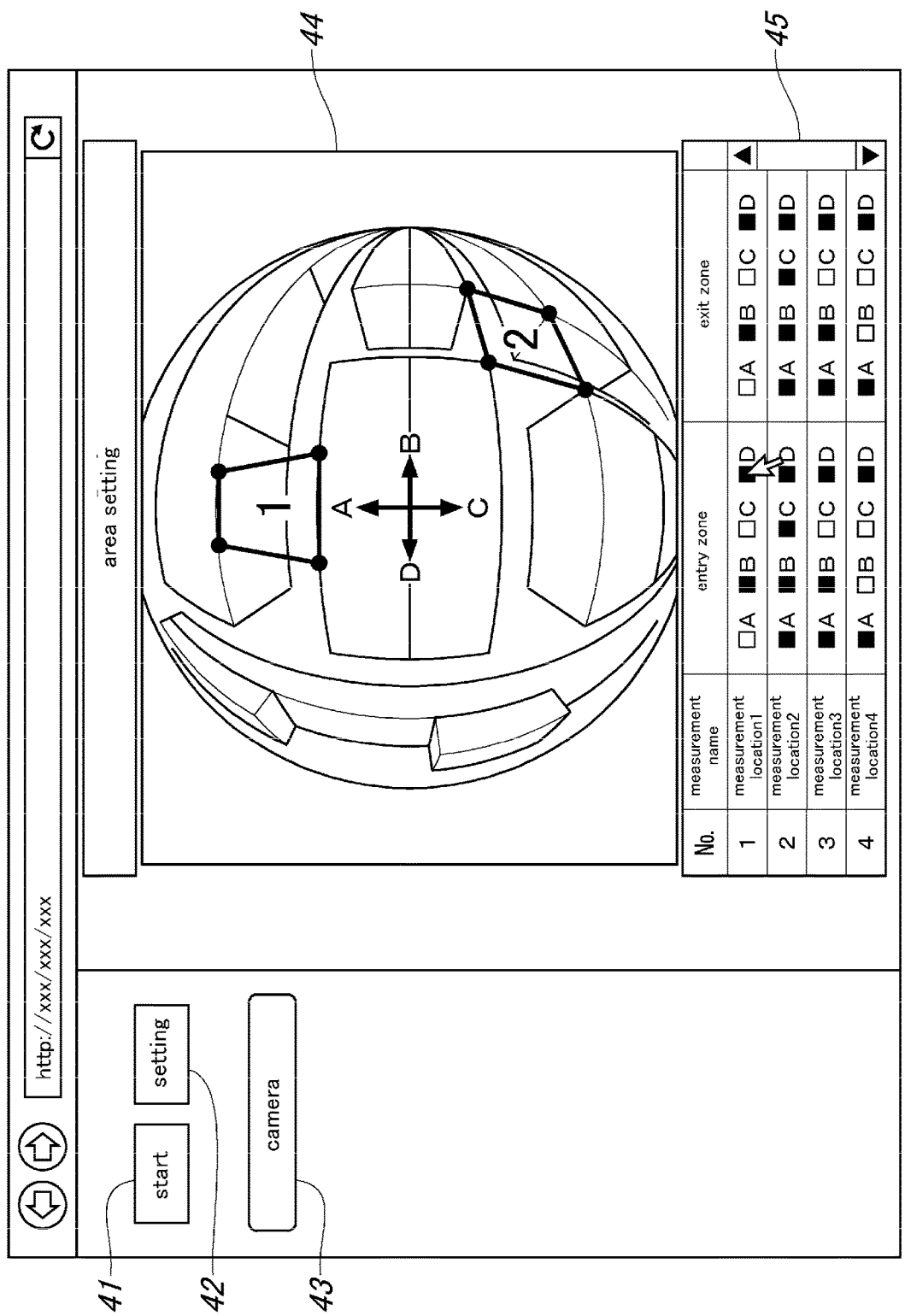
FIG. 6 is an explanatory diagram showing a measurement condition input screen to be displayed on the monitor 4 shown in FIG. 5.

Next, description will be made of an operation of inputting a measurement condition related to the measurement area and the entry and exit zones. FIG. 6 is an explanatory diagram showing a measurement condition input screen to be displayed on the monitor 4 shown in FIG. 5.

This measurement condition input screen is provided to allow the user to specify the measurement areas and the entry and exit zones as a measurement condition, and is provided with a start button 41, a setting button 42, a camera selection button 43, a measurement area input section 44, and an entry zone/exit zone input section 45.

The start button 41 is used to start the person movement analysis process in the person movement analysis unit 32. The setting button 42 is used to cause the measurement area input section 44 and the entry zone/exit zone input section 45 to be displayed. The camera selection button 43 is used to specify one of the cameras 1. When the camera selection button 43 is operated, a screen for allowing selection of the cameras 1 is popped up, and if the user selects one of the cameras 1 in this screen and operates the setting button 42, an image captured by the selected camera 1 is displayed in the measurement area input section 44.

The measurement area input section 44 is provided to display an image captured by the camera 1 and to allow the user to specify a measurement area(s) on the image. To specify a measurement area, the user should input the vertices of the measurement area by use of the input device 6 such as a mouse. For example, a vertex position can be input by moving a pointer on the screen to a desired position by use of the input device 6 and confirming the position (by double-clicking the mouse, for example). At this time, the user visually identifies the non-walkable regions based on the images of the display shelves included in the camera-captured image, and specifies measurement areas in the walkable region which is a region other than the non-walkable regions. When the specifying of the measurement areas is finished, namely, when the positions of the all vertices have been input, rectangular images representing the measurement areas are displayed, and sequential numbers of the measurement areas are displayed thereon.

In the entry zone/exit zone input section 45, the sequential numbers of the measurement areas (No.), names of the measurement areas, and choices of the entry and exit zones are displayed. The names of the measurement areas are input by the user using the input device 6 such as a keyboard.

In the field of the entry and exit zones, the four reference directions A, B, C and D predetermined to serve as a reference for the entire monitored area are displayed as the choices, and using the input device 6 such as a mouse, the user selects the entry and exit zones from among the four choices of A, B, C and D. At this time, the user selects one or more of the directions A, B, C and D to be specified as the entry and exit zones in accordance with the non-walkable regions around each measurement area.

It is to be noted that, in the example shown in FIG. 6, for each of the first measurement area MA1, the second measurement area MA2, the third measurement area MA3 and the fourth measurement area MA4 shown in FIG. 2, the directions that could be specified as the entry and exit zones are all selected. However, it is possible to select, for each measurement area, only the directions relating to the movement patterns with which the number of persons is required to be counted.

Further, in the example shown in FIG. 6, two measurement areas are specified on the image obtained from a single camera 1, and an operation for specifying the remaining measurement areas can be performed after switching the cameras 1 by operating the camera selection button 43. At this time, in a case where a measurement area is set on an image from a certain camera 1 and thereafter an image corresponding to the specified measurement area appears in an image from another camera 1, the specified state of the measurement area should preferably be handed over.

Figure 7:
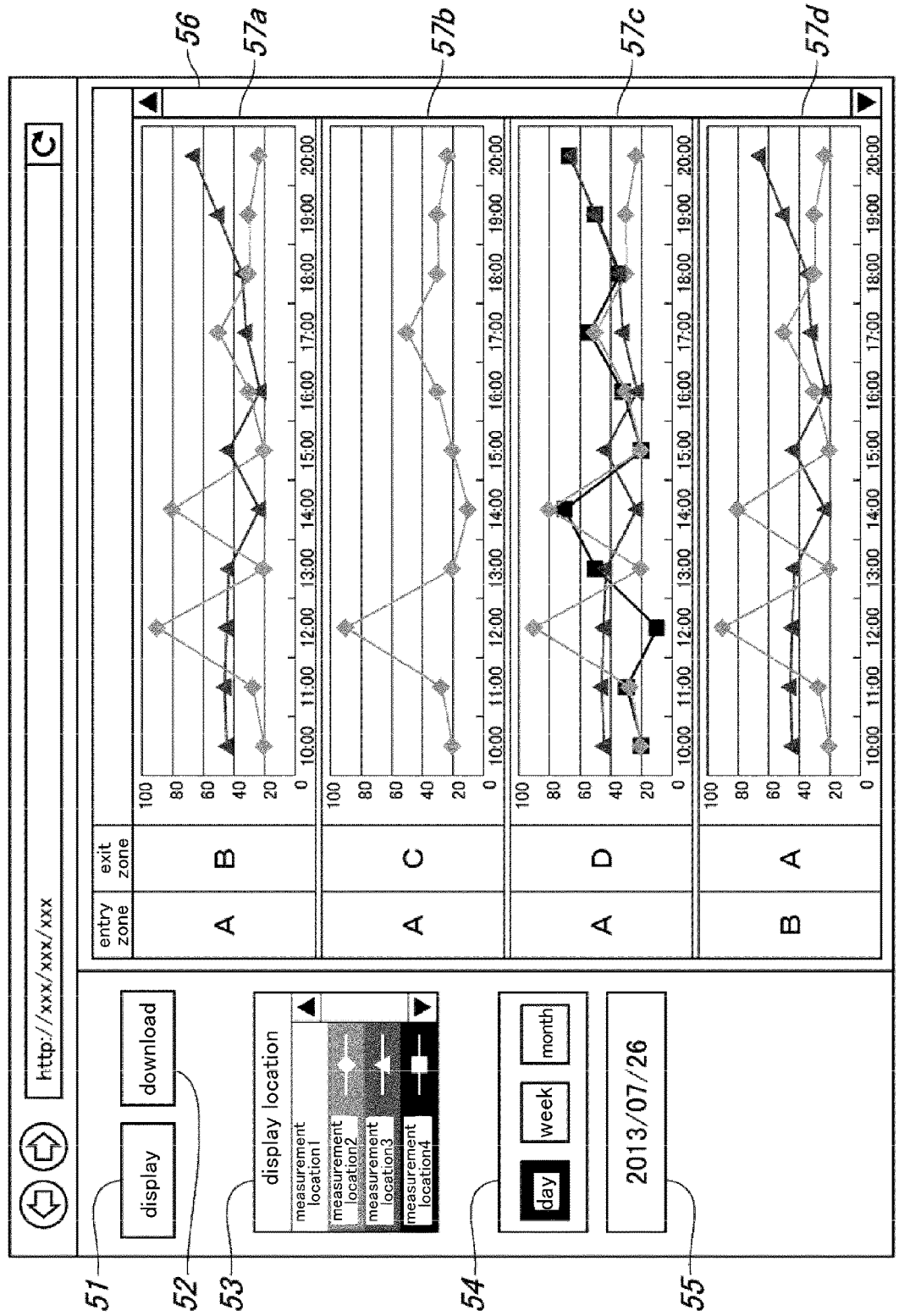
FIG. 7 is an explanatory diagram showing a analysis result output screen to be displayed on the monitor 4 shown in FIG. 5.
Figure 8:
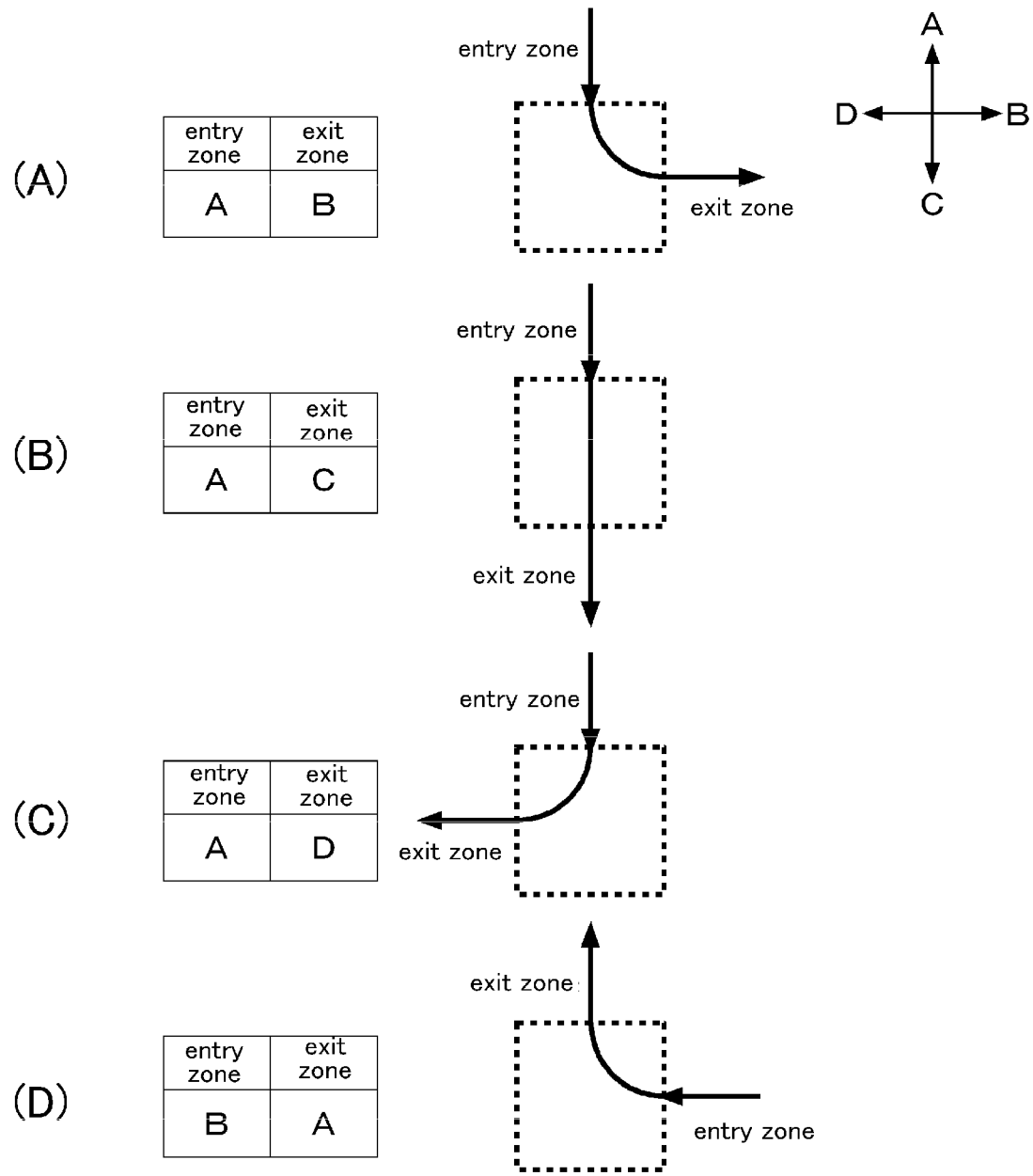
FIG. 8 is an explanatory diagram in (A)-(D) showing examples of a movement pattern defined by a combination of an entry zone and an exit zone.

Next, description will be made of an output of the analysis result obtained by the person movement analysis unit 32 shown in FIG. 5. FIG. 7 is an explanatory diagram showing an analysis result output screen to be displayed on the monitor 4 shown in FIG. 5. FIG. 8 is an explanatory diagram showing examples of a movement pattern defined by a combination of an entry zone and an exit zone.

This analysis result output screen is designed such that the analysis result obtained by the person movement analysis unit 32, namely, the number of persons detected in each measurement area for each aggregation period is output separately for each movement pattern, and the analysis result output screen is provided with a display button 51, a download button 52, a display area selection section 53, an aggregation period selection section 54, a date display section 55, and an analysis result output section 56.

The display button 51 is provided to cause the analysis result to be displayed in the analysis result output section 56. The download button 52 is used to obtain a metafile, such as a CSV (comma-separated values) file, of the analysis result. Thereby, when the analysis result output screen is displayed on a device separate from the PC 3 that executes the person movement analysis process, such as the PC 11 set up at the head office, it is possible to take the analysis result in the PC 11 so that the user can freely edit the analysis result.

The display area selection section 53 is provided to enable selection of the measurement area(s) of which analysis result should be displayed in the analysis result output section 56. In this display area selection section 53, the selected measurement areas are highlighted. In the example shown in FIG. 7, the second measurement area MA2, the third measurement area MA3 and the fourth measurement area MA4 are selected.

The aggregation period selection section 54 is used to select the aggregation period. In the example shown in FIG. 7, "day," "week" or "month" can be selected as the aggregation period. If "day" is selected, the horizontal axis of the graph displayed in the analysis result output section 56 is shown with time zones, when "week" is selected, the horizontal axis of the graph is shown with the days of the week, and when "month" is selected, the horizontal axis of the graph is shown with dates. Upon selection of the aggregation period in this aggregation period selection section 54, a calendar screen is popped up, and the user selects a particular date, week or month to be displayed.

The date display section 55 is provided to display the date of the analysis result that is displayed in the analysis result output section 56. It is to be noted that an arrangement may be made such that the date of the analysis result to be displayed in the analysis result output section 56 can be specified by directly inputting the date in the date display section 55.

In the analysis result output section 56, the analysis result obtained by the person movement analysis unit 32 is displayed; specifically, graphs (line graphs) chronologically connecting the numbers of persons detected for each aggregation period in the respective measurement areas are displayed. The vertical axis of these graphs indicates the number of persons. In the example shown in FIG. 7, the aggregation period is selected as "day," and therefore, the horizontal axis of the graphs is shown with time zones. This enables the user to grasp the characteristics of change in the number of persons depending on the time zone.

Further, in the analysis result output section 56, graph display fields 57a to 57d corresponding to respective movement patterns each defined by a combination of an entry zone and an exit zone are displayed.

In the example shown in FIG. 7, the uppermost graph display field 57a corresponds to the movement pattern with an entry zone indicated by the direction A and an exit zone indicated by the direction B (refer to FIG. 8(A)). The second graph display field 57b from the top corresponds to the movement pattern with an entry zone indicated by the direction A and an exit zone indicated by the direction C (refer to FIG. 8(B)). The third graph display field 57c from the top corresponds to the movement pattern with an entry zone indicated by the direction A and an exit zone indicated by the direction D (refer to FIG. 8(C)). The fourth graph display field 57d from the top corresponds to the movement pattern with an entry zone indicated by the direction B and an exit zone indicated by the direction A (refer to FIG. 8(D)). Besides these, there are various movement patterns, and the remaining movement patterns can be displayed by scrolling.

Further, in each of the graph display fields 57a to 57d of the analysis result output section 56, the graphs for the respective measurement areas are displayed in an overlapping manner. In the example shown in FIG. 7, the graphs for the second measurement area M2, the third measurement area M3 and the fourth measurement area M4, which are selected, are displayed in an overlapping manner in each graph display field, except for the graphs for the measurement areas to which the movement pattern corresponding to the graph display field is not applicable. For instance, the movement pattern with an entry zone indicated by the direction A and an exit zone indicated by the direction C (refer to FIG. 8(B)) is not applicable to the third measurement area M3 and the fourth measurement area M4, and therefore, in the second graph display field 57b from the top, only the graph for the second measurement area M2 is displayed and the graphs for the third measurement area M3 and the fourth measurement area M4 are not displayed.

Thus, because the graphs representing the numbers of persons for each aggregation period are displayed separately for each movement pattern, it is possible to grasp the difference in the characteristics of temporal change in the number of persons between the movement patterns. In addition, for each movement pattern, the graphs for the respective measurement areas are displayed in an overlapping manner, and this makes it possible to grasp the difference in the characteristics of temporal change in the number of persons between the measurement areas. Thus, the state of movement of persons at important locations in the monitored area, where the measurement areas are set, can be grasped from various points of view.

In the example shown in FIG. 7, the darkness of the color of the graphs is varied for different measurement areas to make the graphs for different measurement areas easily distinguished from each other. However, it is also possible to vary the hue of the color of the graphs, such that the graphs are displayed in red, green or blue, for example.

In addition, in the example shown in FIG. 6 and FIG. 7, the PC 3 is provided with a function of a Web server, such that the measurement condition input screen and the analysis result output screen are displayed on a Web browser. In this way, it is possible to realize the functions of inputting of a measurement condition and/or outputting of the analysis result with a generic Web browser installed in a device separate from the PC 3 that executes the person movement analysis process, such as the PC 11 set up at the head office.

As described above, in the present embodiment, output information representing the state of movement of persons for each movement pattern defined by at least one of an entry zone and an exit zone relative to a measurement area is output, and therefore, by setting the measurement area at an important location, such as an intersection of passages, within the monitored area of a store or the like, it is possible for a user such as a store manager to easily grasp the state of movement of persons at the important location within the monitored area.

Further, in the present embodiment, the result of detection by the moving person detection process is aggregated on the basis of a predetermined aggregation period and the number of persons for each movement pattern is acquired for each aggregation period, such that output information relating to the number of persons for each movement pattern for each aggregation period is generated, and therefore, the user can grasp the number of persons for each movement pattern for each aggregation period. Further, by displaying the number of persons for each movement pattern for each aggregation period so as to be arranged in chronological order, it is possible to enable the user to grasp the characteristics of temporal change in the number of persons for each movement pattern.

Further, in the present embodiment, multiple measurement areas are set within the monitored area, and in each of the measurement areas, persons matching the movement patterns are detected, such that output information representing the state of movement of persons for each movement pattern in each of the measurement areas is generated, and therefore, a measurement area can be set at each of multiple important locations present in the monitored area, whereby the user can grasp the state of movement of persons at each of the important locations within the monitored area.

Further, in the present embodiment, the entry and exit zones are set relative to each of the multiple measurement areas based on multiple reference directions predetermined for the entire monitored area, and therefore, the entry and exit zones are set based on the reference directions common to the multiple measurement areas, and this makes it possible to easily compare the state of movement of persons in one measurement area with that in another measurement area. In addition, when specifying the entry and exit zones, the user is only required to select from among the multiple reference directions on the basis of the non-walkable regions around each measurement area, and therefore, the operation for specifying the entry and exit zones becomes easy.

Further, in the present embodiment, both the entry zone and the exit zone are set relative to the measurement area, and persons are detected separately for each movement pattern defined by a combination of the entry zone and the exit zone, and therefore, the user can grasp what routes (including before and after passing through the measurement area) persons took to pass through the measurement area, whereby, the user can grasp the state of movement of persons passing through the measurement area in detail.

Further, in the present embodiment, the state of movement of persons for each movement pattern is displayed in an arrangement, and therefore, the user can grasp at a glance the difference in the state of movement of persons between the movement patterns.

Further, in the present embodiment, the images include those captured by an omnidirectional camera, which can cover a wide range, and thus, the number of cameras to be installed can be reduced. In addition, by installing the omnidirectional camera on the ceiling, it becomes possible to set the position of the measurement area definitely on the image, and because the state of passing of the traffic line of each person through the measurement area becomes clear, the analysis accuracy can be improved.

Further, in the present embodiment, the measurement area has a polygonal shape and is set such that all vertices thereof are in contact with the non-walkable regions and at least two sides thereof cross the walkable region, and therefore, it is possible to detect the persons passing through the walkable region without fail, whereby the user is enabled to grasp the state of movement of persons accurately. In addition, when specifying a measurement area, the user is only required to input the positions of the vertices of a polygon, and therefore, the operation for specifying the measurement area becomes easy.

Further, in the present embodiment, the measurement area has a rectangular shape and, when the walkable region forms a cross-shaped intersection, is set such that four vertices thereof are positioned on corner points of non-walkable regions, and therefore, it is possible to detect the persons passing through the cross-shaped intersection without fail, whereby the user can grasp the state of movement of persons at the cross-shaped intersection accurately. Further, in the present embodiment, the measurement area is rectangular in shape and, when the walkable region forms a T-shaped intersection, is set such that one side thereof is in contact with a non-walkable region and two vertices thereof are positioned on corner points of non-walkable regions, and therefore, it is possible to detect the persons passing through the T-shaped intersection without fail, whereby the user can grasp the state of movement of persons at the T-shaped intersection accurately.

Figure 9:
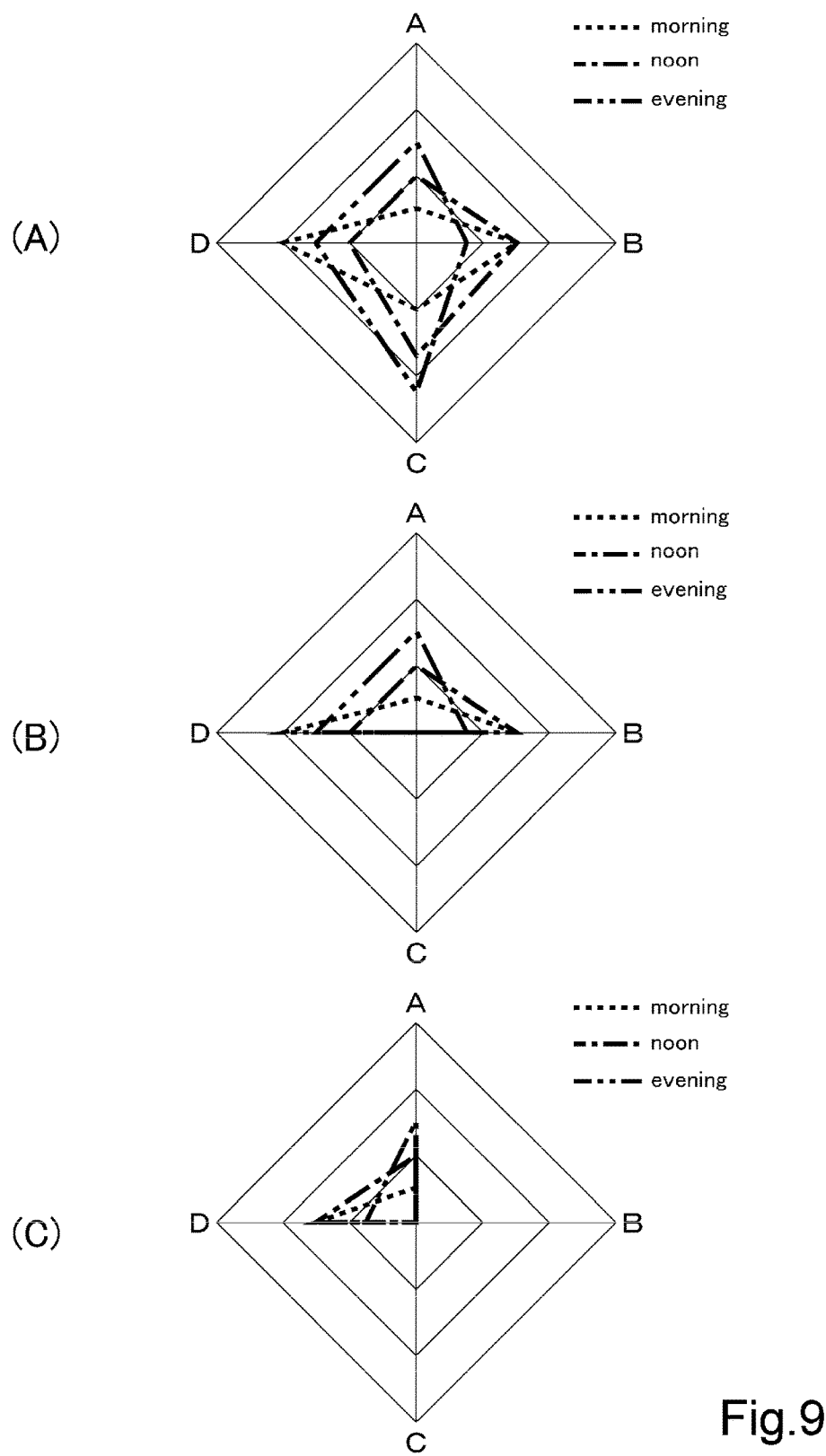
FIG. 9 is an explanatory diagram in (A)-(C) showing a main part of an analysis result output screen to be displayed on the monitor 4 shown in FIG. 5.

Next, description will be made of another example of the output of the analysis result of the person movement analysis unit 32 shown in FIG. 5. FIG. 9 is an explanatory diagram showing a main part of an analysis result output screen to be displayed on the monitor 4 shown in FIG. 5.

In this embodiment, the moving person detection unit 35 shown in FIG. 5 is configured to detect persons separately for each movement pattern defined by at least one of the entry zone and the exit zone relative to the measurement area, the aggregation unit 36 is configured to obtain the number of persons for each movement pattern, and the screen generation unit 39 is configured to generate display information for displaying the number of persons for each movement pattern in a radar chart, as shown in FIG. 9.

Particularly, in each radar chart shown in FIG. 9, the number of persons for each movement pattern defined by an exit zone is displayed, and four directions A, B, C and D predetermined for the entire monitored area are assigned to the four axes such that the number of persons for each movement pattern is represented on the corresponding axis. This radar chart enables the user to grasp how many persons have moved in which direction when exiting the measurement area.

Further, this radar chart is displayed separately for each measurement area. The radar chart shown in FIG. 9(A) corresponds to the case of the second measurement area MA2 set at a cross-shaped intersection as shown in FIG. 3(B), at which persons can move in any of the four directions A, B, C and D, and accordingly, the number of persons for each of the movement patterns defined by specifying the exit zone relative to the measurement area as the directions A, B, C and D, respectively, is displayed. The radar chart shown in FIG. 9(B) corresponds to the case of the third measurement area MA3 set at a T-shaped intersection as shown in FIG. 3(C), at which persons can move in any of the three directions A, B and D, and accordingly, the number of persons for each of the movement patterns defined by specifying the exit zone relative to the measurement area as the directions A, B and D, respectively, is displayed. The radar chart shown in FIG. 9(C) corresponds to the case of the fourth measurement area MA4 set at an L-shaped path as shown in FIG. 3(D), at which persons can move in either of the two directions A and D, and accordingly, the number of persons for each of the movement patterns defined by specifying the exit zone relative to the measurement area as the directions A and D, respectively, is displayed.

In addition, in this radar chart, the opening hours of a day is divided into three time zones, namely, morning, noon and evening, and the number of persons for each movement pattern is displayed separately for each of these time zones. This makes it possible to grasp the difference in the number of persons for each movement pattern between different time zones.

As described above, in this embodiment, persons are detected separately for each movement pattern defined by the exit zone relative to the measurement area, and the number of persons for each movement pattern is displayed in a radar chart, and therefore, the user can grasp at a glance the number of persons for each movement pattern defined by the exit zone, namely, how many persons have moved from the measurement area in which direction.

It is to be noted that though the number of persons for each movement pattern defined by an exit zone was displayed in the example shown in FIG. 9, it is also possible to display the number of persons for each movement pattern defined by an entry zone. In such an arrangement, the user can grasp at a glance the number of persons for each movement pattern defined by the entry zone; namely, how many persons have entered the measurement area from which direction. Further, the displaying of the number of persons for each movement pattern is not limited to that using a radar chart but also may use various charts such as a bar chart.

In the foregoing, the present invention has been described in terms of specific embodiments thereof. However, these embodiments are provided for illustrative purposes and the present invention is not limited by the embodiments. It is also to be noted that not all of the structural elements of the person movement analysis device, person movement analysis system and person movement analysis method of the present invention shown in the above embodiments are necessarily indispensable, and they may be selectively used as appropriate at least within the scope of the present invention.

For example, in the above embodiments, a description was made of an exemplary case in which the invention was applied to a store such as a convenience store. However, the present invention is not limited to such a store, and may be applied broadly to a place where it is beneficial to grasp state of movement of persons moving in the monitored area.

Further, in the above embodiments, each measurement area has a rectangular shape as shown in FIG. 2. However, the measurement area is not limited to a rectangular one, and may have a triangular shape or a polygonal shape having five or more vertices.

Further, in the above embodiments, four directions A, B, C and D serving as a reference for the entire monitored area were predetermined as shown in FIG. 2. However, the reference directions may not be limited to four, and two, three or more than four reference directions may be set.

Further, in the above embodiments, the measurement area was set on a single passage, cross-shaped intersection, T-shaped intersection and L-shaped path as shown in FIG. 2. Besides them, the measurement area may be set at a three-forked intersection (Y-shaped intersection) where three passages meet 3 or a multi-forked intersection where five or more passages meet.

Further, in the above embodiments, the cameras 1 were each embodied as an omnidirectional camera using a fish-eye lens to have a view range of 360 degrees. However, a camera having a predetermined angle of view, namely, a so-called box camera, may also be used.

Further, though in the above embodiments, the processes necessary for the person movement analysis were executed by the PC 3 set up at the store, the necessary processes may be executed by the PC 11 set up at the head office or a cloud computer 21 forming a cloud computing system, as shown in FIG. 1. Further, the necessary processes may be executed by cooperation of multiple information processing devices, such that the multiple information processing devices communicate information with each other via a communication medium such as an IP network or LAN. In this case, the multiple information processing devices jointly executing the necessary processes constitute a customer management system.

In such a configuration, it is preferred that a device set up at the store be configured to execute at least the person detection process and the traffic line generation process. Thereby, an amount of data required for the remaining processes can be small, and therefore, even if the remaining processes are performed by an information processing device set up at a place other than the store, such as the PC 11 set up at the head office, the communication load can be small, and thus, it is easy to operate the system in the form of a wide area network.

It is also possible to configure the cloud computer 21 to perform at least processes requiring a large amount of computation, such as the person detection process and the traffic line generation process, of the processes necessary for the person movement analysis. In this configuration, since the cloud computer 21 performs the processes requiring a large amount of computation, it is not necessary to prepare a high-speed information processing device on the user side; namely at the store or the like. Further, since the remaining processes require a small amount of computation, the remaining processes can be executed as extended functions of an information processing device set up at the store to serve as a sales information management device, and this can reduce the cost born by the user.

The cloud computer 21 may be configured to execute all of the necessary processes or to execute at least the output information generation process of the necessary processes. Such a structure makes it possible to view the analysis result on a mobile terminal such as a smartphone 22 in addition to the PC 3 set up at the store and the PC 11 set up at the head office, and this allows a user to view the analysis result not only at the store or the head office but also at any other place, such as a place the user is visiting on business.

Further, though in the above embodiments, the analysis result was output on the monitor 4 of the PC 3 set up at the store, it is also possible to provide an output device for outputting the analysis result separately from the PC 3. For example, it is possible to use the PC 11 set up at the head office or the smartphone 22 as a browser device for viewing the analysis result, or to provide the sales information management device set up at the store with a function of a browser device for viewing the analysis result. It is also possible to output the analysis result through a printer.

Further, though in the above embodiments, the measurement condition input screen and the analysis result output screen were displayed on the monitor 4 of the PC 3 set up at the store and an input operation was performed the input device 6 connected with the PC 3, it is possible to provide an information processing device for performing necessary input and output, particularly a mobile information processing device such as a tablet terminal, separately from the PC 3 that executes the person movement analysis process.

INDUSTRIAL APPLICABILITY

The person movement analysis device, person movement analysis system and person movement analysis method according to the present invention have an advantage of capable of allowing a user such as a store manager to easily grasp the state of movement of persons at an important location within the monitored area, and thus, are useful as a person movement analysis device, a person movement analysis system and a person movement analysis method for analyzing a state of movement of persons within a monitored area based on captured images of the monitored area.

GLOSSARY

1 camera
2 recorder
3 PC
4 monitor
6 input device
11 PC
12 monitor
21 cloud computer
22 smartphone
31 monitoring unit
32 person movement analysis unit
33 measurement condition setting unit
34 traffic line acquisition unit
35 moving person detection unit
36 aggregation unit
37 GUI control unit
38 input information acquisition unit
39 screen generation unit (output information generation unit)

The invention claimed is:

1. A person movement analysis device for analyzing state of movement of persons in a monitored area based on captured images of the monitored area, the device comprising:
a processor; and
a memory that stores an instruction,
the device further comprising, as a configuration when the processor executes the instruction stored in the memory:
a measurement condition setter that receives an input operation of a user specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition;
a traffic line acquirer that acquires traffic line information of each person detected from the captured images;
a moving person detector that detects, in the measurement area, persons matching movement patterns defined by at least one of the entry zone and the exit zone, based on the traffic line information acquired by the traffic line acquirer;
an aggregator that, for a plurality of predetermined aggregation periods, aggregates a result of detection by the moving person detector for each aggregation period and acquires a number of persons that match each movement pattern for each aggregation period; and
an output information generator that generates, based on the result of detection by the moving person detector, output information representing a state of movement of persons for each movement pattern in the measurement area and relating to the number of persons that match each movement pattern for each aggregation period acquired by the aggregator.

2. The person movement analysis device according to claim 1, wherein:
the measurement condition setter sets a plurality of measurement areas within the monitored area in response to an input operation of the user;
the moving person detector detects, in each of the measurement areas, persons matching the movement patterns;
and the output information generator generates output information representing the state of movement of persons for each movement pattern in each of the measurement areas.

3. The person movement analysis device according to claim 2, wherein the measurement condition setter sets at least one of the entry zone and the exit zone relative to each of the plurality of measurement areas based on a plurality of reference directions predetermined for the entire monitored area.

4. The person movement analysis device according to claim 1, wherein:
the measurement condition setter sets both the entry zone and the exit zone in response to an input operation of the user; and
the moving person detector detects persons separately for each movement pattern defined by a combination of the entry zone and the exit zone.

5. The person movement analysis device according to claim 1, wherein the output information generator generates, as the output information, display information for displaying the state of movement of persons for each movement pattern in an arrangement.

6. The person movement analysis device according to claim 1, wherein:
the moving person detector detects persons separately for each of the movement patterns defined by at least one of the entry zone and the exit zone; and
the output information generator generates, as the output information, display information for displaying the number of persons that match each movement pattern in a radar chart.

7. The person movement analysis device according to claim 1, wherein the captured images include those captured by an omnidirectional camera.

8. The person movement analysis device according to claim 1, wherein the measurement area has a polygonal shape and is set such that all vertices thereof are in contact with the non-walkable region and at least two sides thereof cross the walkable region.

9. The person movement analysis device according to claim 8, wherein the measurement area has a rectangular shape, and in a case where the walkable region forms a cross-shaped intersection, is set such that four vertices of the measurement area are positioned on corner points of the non-walkable region.

10. The person movement analysis device according to claim 8, wherein the measurement area has a rectangular shape, and in a case where the walkable region forms a T-shaped intersection, is set such that one side of the measurement area contacts the non-walkable region and two vertices of the measurement area are positioned on corner points of the non-walkable region.

11. A person movement analysis system for analyzing a state of movement of persons within a monitored area based on captured images of the monitored area, the system comprising:
a camera for capturing images of the monitored area; and
a plurality of information processing devices,
wherein any one of the plurality of information processing devices includes a processor and a memory that stores an instruction, and the processor of the any one of the plurality of information processing devices further comprises, as a configuration when the processor executes the instruction stored in the memory:
a measurement condition setter that receives an input operation of a user specifying a measurement area in a walkable region, which is a region in the monitored area other than a non-walkable region and specifying at least one of an entry zone and an exit zone of persons relative to the measurement area, and in response to the input operation of the user, sets the measurement area and at least one of the entry zone and the exit zone as a measurement condition;
a traffic line acquirer that acquires traffic line information of each person detected from the captured images;
a moving person detector that detects, in the measurement area, persons matching movement patterns defined by at least one of the entry zone and the exit zone, based on the traffic line information acquired by the traffic line acquirer;
an aggregator that, for a plurality of predetermined aggregation periods, aggregates a result of detection by the moving person detector for each aggregation period and acquires a number of persons that match each movement pattern for each aggregation period; and
an output information generator that generates, based on the result of detection by the moving person detector, output information representing a state of movement of persons for each movement pattern in the measurement area and relating to the number of persons that match each movement pattern for each aggregation period acquired by the aggregator.

12. A person movement analysis method for analyzing a state of movement of persons within a monitored area based on captured images of the monitored area, the method comprising, when a processor of an information processing device executes instructions stored in a memory of the information processing device:
receiving an input operation performed by a user of specifying a measurement area in a walkable region, which is a region in the monitored area other than a non-walkable region and specifying at least one of an entry zone and an exit zone of persons relative to the measurement area, and in response to the input operation of the user, setting the measurement area and at least one of the entry zone and the exit zone as a measurement condition;
acquiring traffic line information of each person detected from the captured images;
detecting, in the measurement area, persons matching movement patterns defined by at least one of the entry zone and the exit zone, based on the traffic line information acquired by the acquiring;
aggregating, for a plurality of predetermined aggregation periods, a result of the detecting for each aggregation period and acquiring a number of persons that match each movement pattern for each aggregation period; and
generating, based on the result of detection by the detecting, output information representing a state of movement of persons for each movement pattern in the measurement area and relating to the number of persons that match each movement pattern for each aggregation period.

* * * * *